United States Patent [19]

Lanzrath

[11] 4,455,491

[45] Jun. 19, 1984

[54] WIND DRIVEN DEVICE AND METHOD OF RECOVERING WIND ENERGY

[76] Inventor: Ralph A. Lanzrath, 1857 Wawona, Wichita, Kans. 67206

[21] Appl. No.: 470,926

[22] Filed: Apr. 11, 1983

[51] Int. Cl.³ .......................... F03B 3/14; F03D 7/06
[52] U.S. Cl. ........................................ 290/44; 290/55; 416/109
[58] Field of Search .................... 290/44, 55; 416/108, 416/109, 113, 116, 119

[56] References Cited

U.S. PATENT DOCUMENTS

| | | | |
|---|---|---|---|
| 4,047,833 | 9/1977 | Decker | 290/55 |
| 4,278,894 | 7/1981 | Ciman | 290/44 |

FOREIGN PATENT DOCUMENTS 736278  6/1943  Fed. Rep. of Germany ...... 416/109

*Primary Examiner*—G. Z. Rubinson
*Assistant Examiner*—Shelley Wade
*Attorney, Agent, or Firm*—John H. Widdowson

[57] ABSTRACT

A wind driven device for driving an electrical generator to produce electricity having a base, an anchor pole stationarily affixed to the base, and a drive assembly support rotatably mounted around the anchor pole. A plurality of gears engage the lower portion of the drive assembly support. The device also includes an upper exterior wind column support and a lower exterior wind column support. A plurality of attachment beams are connected to the drive assembly. A plurality of wind panel support columns connect to at least one of the attachment beams and to the upper and lower exterior support. A plurality of wind panels pivotally engage the wind panel support columns and is responsive to the wind such that the force of the wind against the wind panel causes the drive assembly support and the attached gears to revolve to provide for a power take off from the revolving gears to drive the electrical generator. A mobile wind panel angle selection guide is positioned around the drive assembly support to permit operation of the wind driven device when the direction of the wind changes. A method of recovering wind energy to drive an electrical generator to produce electricity having the steps of positioning the mobile wind panel angle selection guide around the drive assembly. A plurality of wind panels is mounted to the drive assembly to be guided by the mobile wind panel angle selection guide such that the force of the wind against the guided wind panels rotates the drive assembly which in turn causes the connected gears to operate the electrical generator. The position of the mobile wind panel guide is subsequently adjusted such that the force of the wind against any particular wind panel is a maximum when the particular wind panel is in a predetermined position with respect to the mobile wind panel angle selection guide.

5 Claims, 15 Drawing Figures

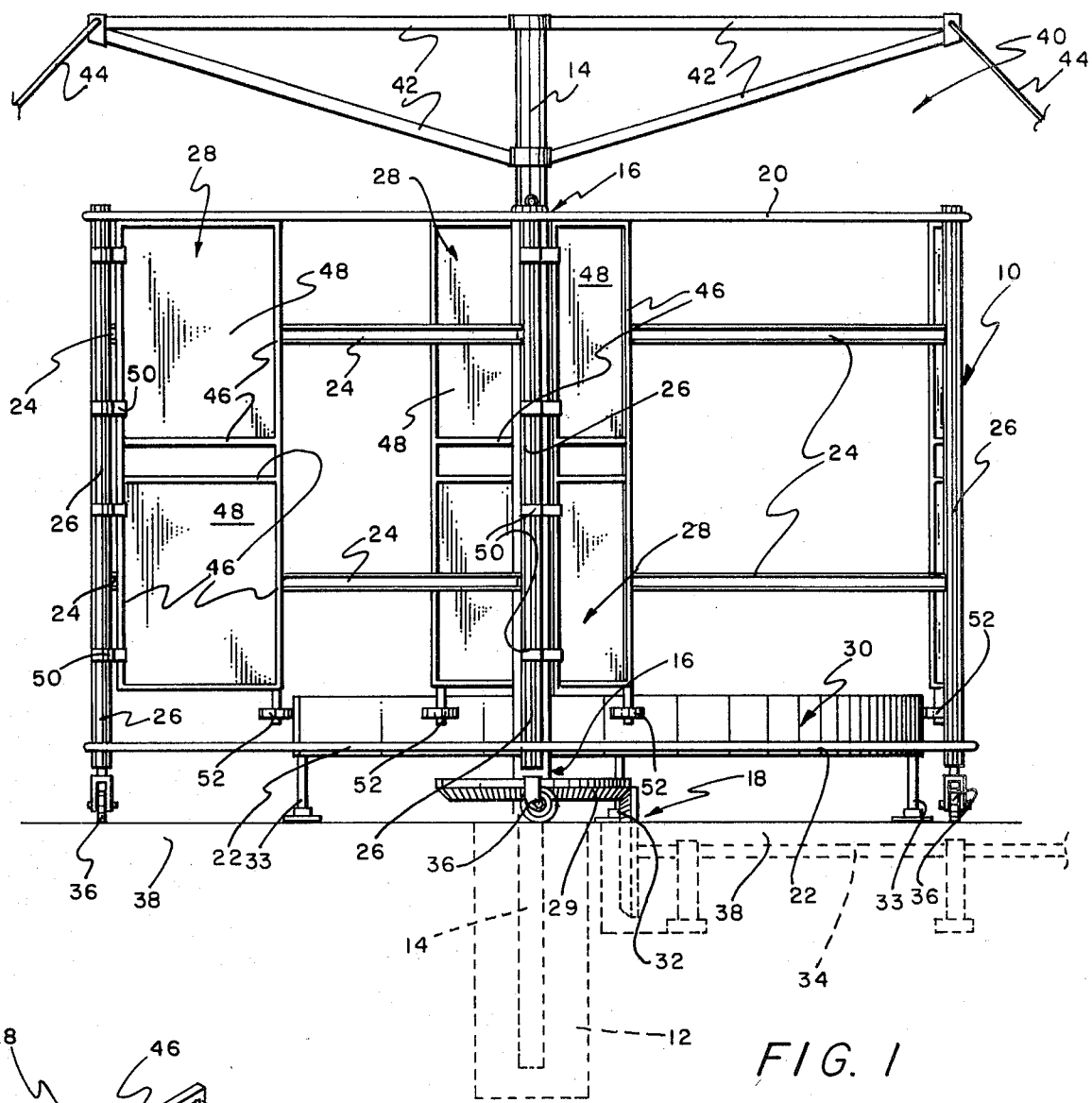
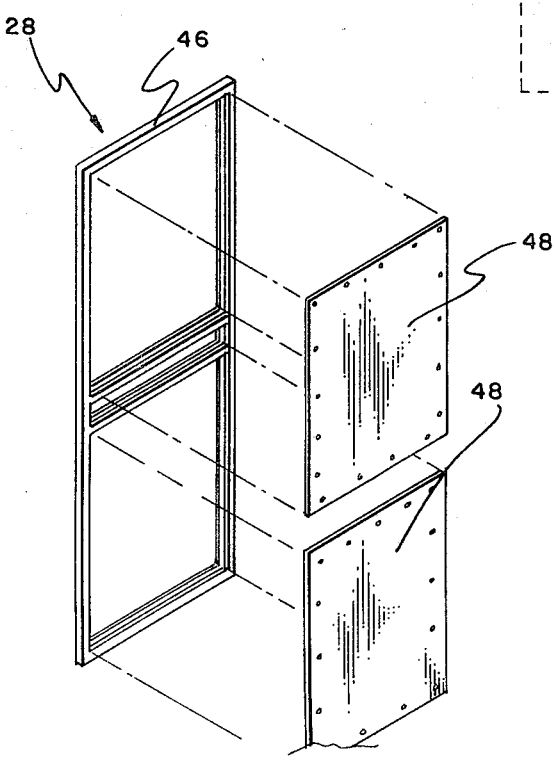
FIG. 1
FIG. 2

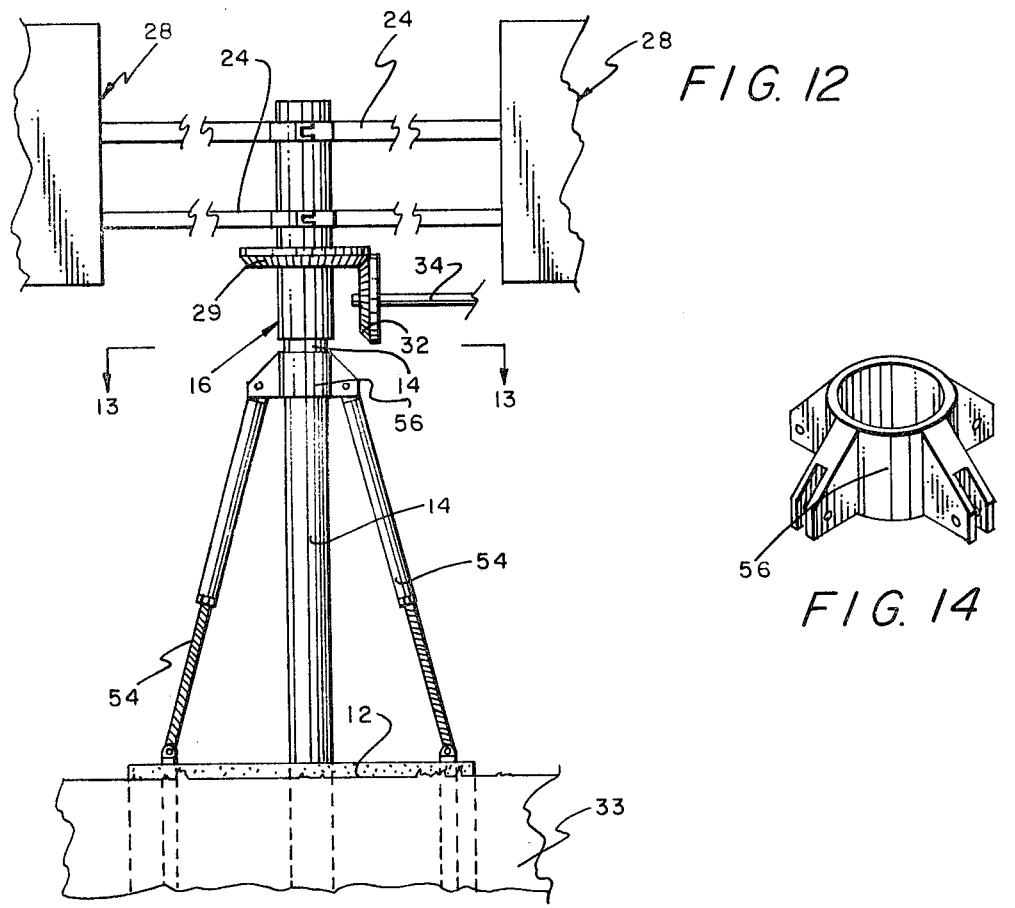
FIG. 12
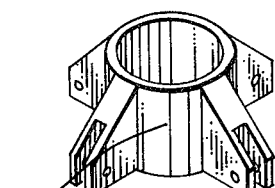
FIG. 14
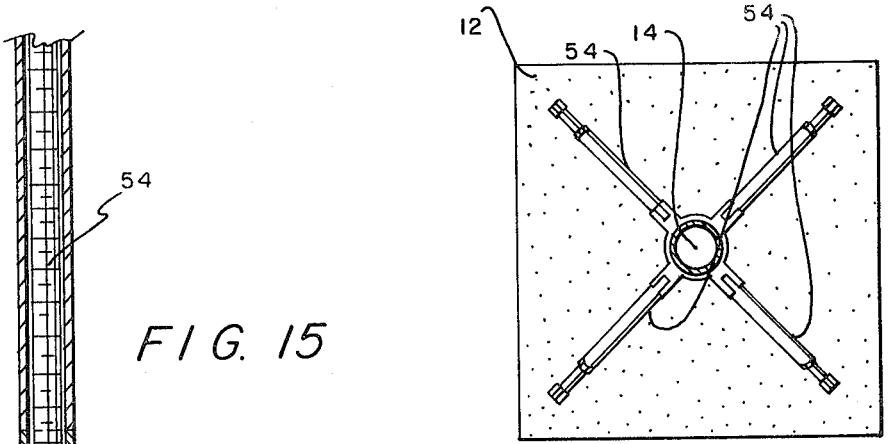
FIG. 15
FIG. 13

WIND DRIVEN DEVICE AND METHOD OF RECOVERING WIND ENERGY

BACKGROUND OF THE INVENTION

1. Field of the Invention

This invention provides a wind driven device and a method of recovering wind energy. More specifically, this invention contemplates a novel wind driven device for driving an electrical generator to produce electricity and a method of recovering energy to drive the electrical generator.

2. Description of the Prior Art

U.S. Pat. No. 544,654 by Bowen illustrates an electrical generating plant wherein the assembly includes a frame supporting a plurality of vertically extending vanes or paddles and wherein the frame is mounted on a wheeled support engaging a track so as to allow free rotation of the same in response to the action of the wind. U.S. Pat. No. 4,134,710 by Atherton discloses a device which includes a rotary vane structure that is wind driven. The vanes are horizontal. The framework supporting the vanes is rotatable and includes wheels that allow free rotation of the framework supporting the vanes during operation of an electrical generator. None of the foregoing prior art teaches or suggests the particular wind driven device and method of recovering wind energy of this invention.

SUMMARY OF THE INVENTION

This invention accomplishes its desired objects by providing a wind driven device for driving an electrical generator to produce electricity comprising a base; an anchor pole stationarily affixed to the base, a drive assembly support rotatably mounted around the anchor pole; and a power drive means secured to the lower portion of the drive assembly support. The device also includes an upper and lower exterior wind column support means, and a plurality of attachment beams connected to the drive assembly. The wind driven device further includes a plurality of wind panel support columns. Each wind panel support column connects to at least one of the attachment beams and to the upper exterior support means and to the lower exterior support means. A plurality of wind panel means pivotally engage the wind panel support columns and is responsive to the wind such that the force of the wind against the wind panel means causes the drive assembly support and the attached power drive means to revolve to provide for a power takeoff from the revolving power drive means to drive the electrical generator. A mobile wind panel angle selection guide means is positioned around the drive assembly support to permit operation of the wind driven device when the direction of the wind changes. This invention additionally accomplishes its desired objects by providing a novel method of recovering wind energy to drive an electrical generator, or the like, to produce electricity. The method comprises the step of positioning a mobile wind panel angle selection guide means around a drive assembly means which is rotatably mounted to an anchor pole of a wind driven device engaged to the electrical generator through a power drive means connected to the drive assembly means. A plurality of wind panel means is mounted to the drive assembly to be guided by the mobile wind panel angle selection guide means such that the force of the wind against the guided wind panel means rotates the drive assembly which in turn causes the connector power drive means to operate the electrical generator. The position of the mobile wind panel angle selection guide means is adjusted such that the force of the wind against any particular wind panel means is a maximum when any particular wind panel means is in a predetermined position with respect to the mobile wind panel angle selection guide means.

It is an object of the invention to provide a novel wind driven device and method of recovering wind energy.

Still further objects of the invention reside in the provision of a wind driven device which is capable of easily being assembled and operated notwithstanding a change in the direction of the wind, and is relatively inexpensive to manufacture.

These, together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 1 is a side elevational view of the wind driven device;

FIG. 2 is a segmented perspective view of a wind panel;

FIG. 12 is another embodiment of the invention which is a low capacity wind driven device which has braces and no angle selection wheels;

FIG. 13 is a horizontal sectional top plan view taken in direction of the arrows and along the plane of line 13-13 in FIG. 12;

FIG. 14 is a perspective view of the anchor clamp; and

FIG. 15 is a partial vertical sectional view of the braces for the embodiment of the invention of FIG. 12.

DETAILED DESCRIPTION OF THE INVENTION

Figure 3:
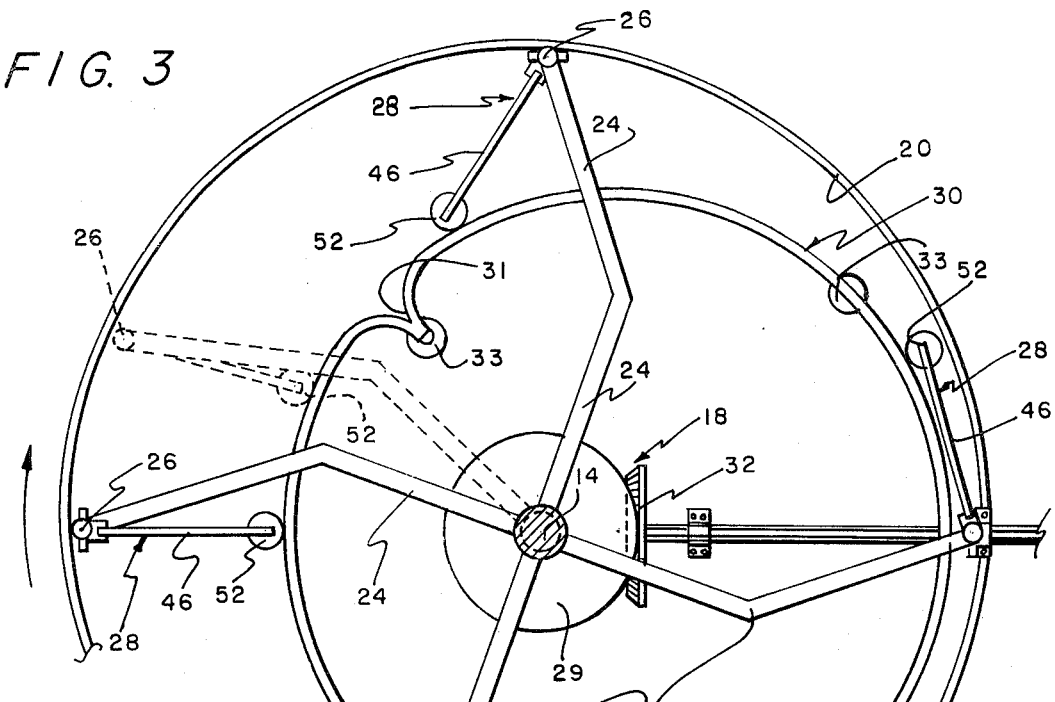
FIG. 3 is a top plan view of the wind driven device without the guy assembly.
Figure 4:
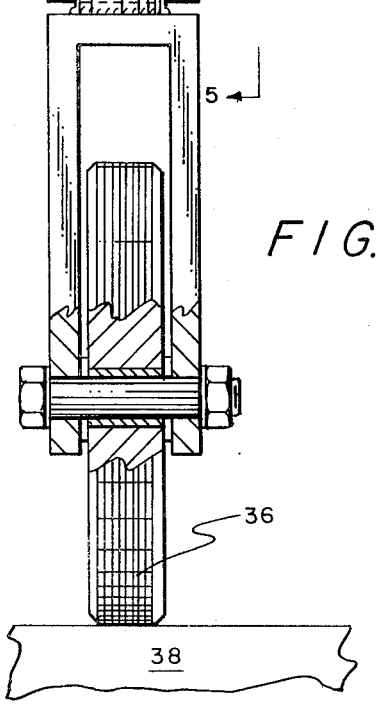
FIG. 4 is an enlarged partial vertical sectional view of the column support and angle selection wheel.
Figure 5:
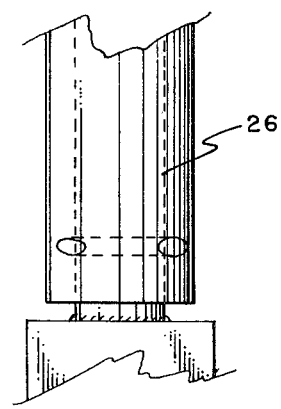
FIG. 5 is a side elevational view taken in direction of the arrows and along the plane of line 5—5 in FIG. 4.
Figure 6:
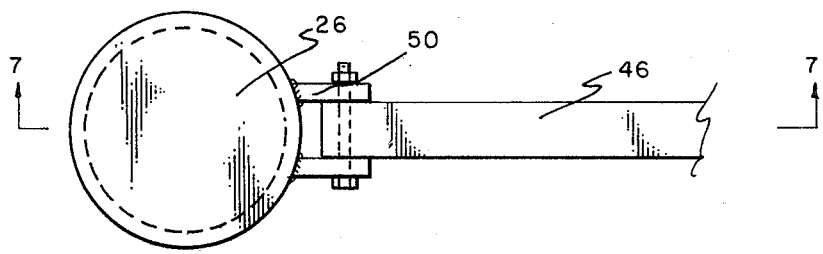
FIG. 6 is a partial top plan view of a column support having a wind panel hingedly connected thereto.
Figure 7:
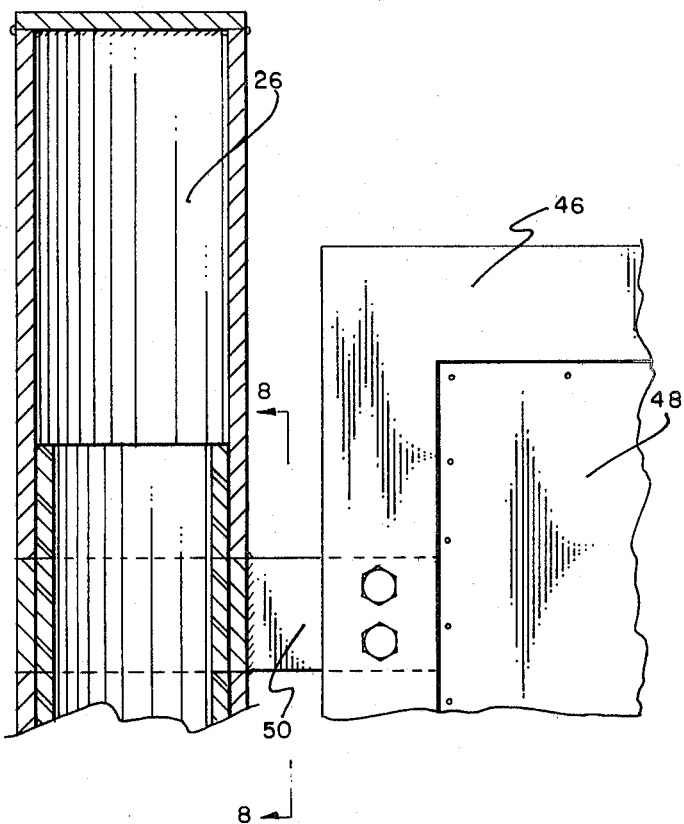
FIG. 7 is an enlarged partial vertical sectional view taken in direction of the arrows and along the plane of line 7—7 in FIG. 6.
Figure 8:
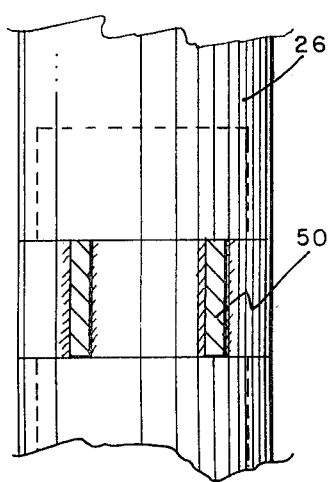
FIG. 8 is a vertical sectional view taken in direction of the arrows and along the plane of line 8—8 in FIG. 7.
Figure 9:
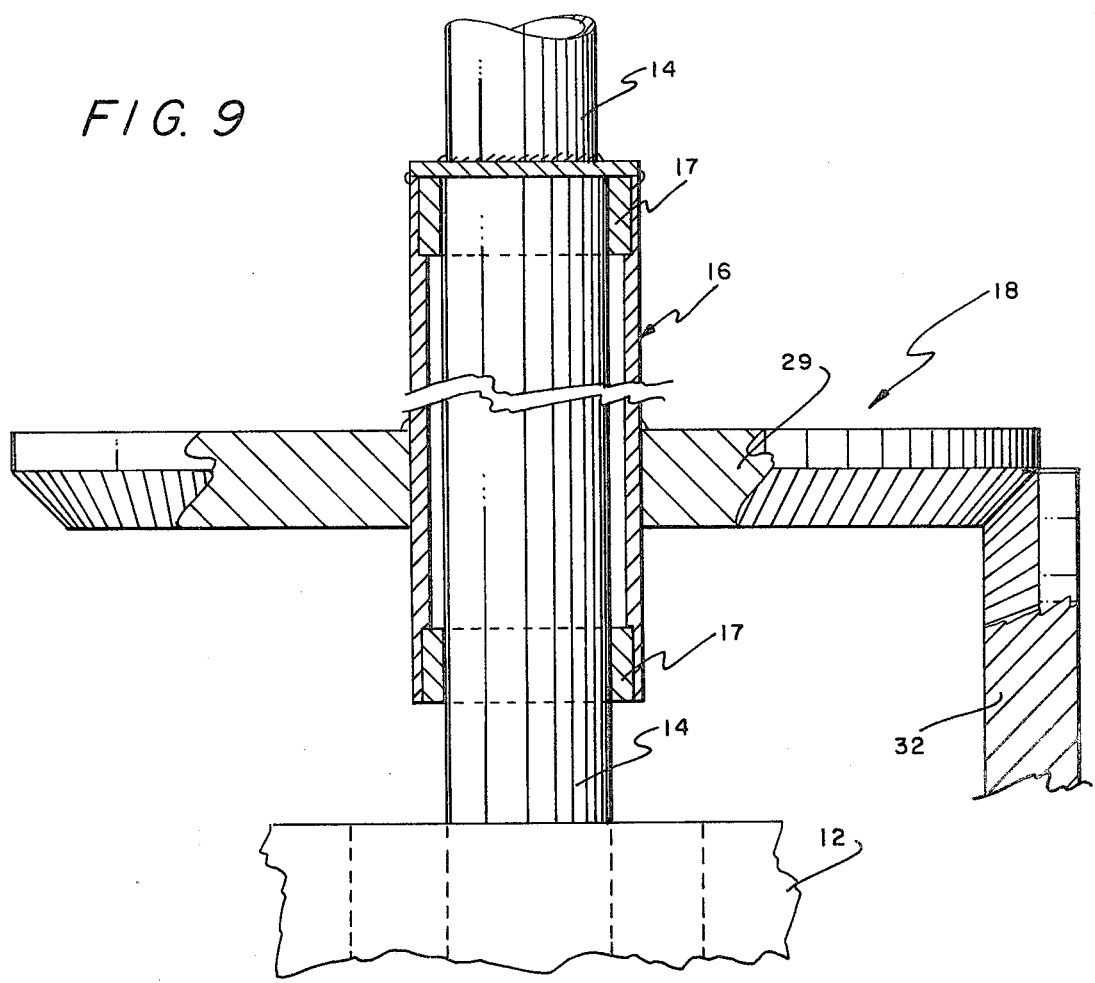
FIG. 9 is an enlarged vertical sectional view of the power drive means or the interconnecting gears which engage the drive assembly.

Referring in detail now to the drawings wherein similar parts of the invention are represented by like reference numerals, there is seen the wind driven device, generally illustrated as 10, having a base 12 and an anchor pole 14 stationarily affixed to the base 12. A drive assembly support, generally illustrated as 16, is rotatably mounted around the anchor pole 14. Anchor pole bearings 17 attach to the anchor pole 14 to provide a bearing surface for the drive assembly support 16 to rotate around. A power drive means, generally illustrated as 18, is secured to the lower portion of the drive assembly support 16. Wind driven device 10 also includes an upper exterior circular wind column support 20, a lower exterior circular wind column support 22, a plurality of attachment beams 24 connected to the drive assembly support 16, and a plurality of wind panel support columns 26. As illustrated in FIGS. 1 and 3, each wind panel support column 26 connects to at least one of the attachment beams 24 and to the upper exterior support 20 and to the lower exterior support 22. A plurality of wind panel means, generally illustrated as 28, pivotally engages the wind panel support columns 26 and is responsive to the wind such that the force of the wind against the wind panel means 28 causes the drive assembly support 16 and the attached power drive means 18 to revolve to provide for a power takeoff from the revolving power drive means 18 to drive an electrical generator (not shown in the drawings). A mobile circular wind panel angle selection guide means, generally illustrated as 30, having an indentation 31 and implanting support pegs 33, is positioned around the drive assembly support 16 to permit operation of the wind driven device 10 when the direction of the wind changes. Indentation 31 functions to change the angular traveling position of each wind panel means 28 about and with respect to the selection guide means 30.

In a preferred embodiment of the invention, the power drive means 18 includes a drive assembly gear 29 secured to the lower portion of the drive assembly 16, and a power takeoff gear 32 which meshes at right angles with the drive assembly gear 29 and has a generator shaft 34 secured thereto for leading to a generator. Also in a preferred embodiment of the invention, each wind panel support column 26 includes a transport wheel 36 rotatably secured underneath thereto to support the support columns 26 against the grid 38 as the wind driven device 10 revolves about its anchor pole 14. The anchor pole 14 may additionally have a guy wire assembly means, generally illustrated as 40, having brace 42 and wire 44 leading to the grid 38, secured thereto for supporting the wind driven device 10.

Each wind panel means 28 has a frame 46 and panels 48 disposed within the frame 46. Hinges 50 pivotally secure the combined frame 46 and panels 48 to its particular support column 26. Each wind panel means 28 comprises an angle selection wheel 52 for traversing the exterior circular surface of the selection guide means 30 to angle each of the wind panel means 28 to the appropriate angle of the wind. The selection wheel 52 is adapted in operation of the invention to temporarily lodge in the identation 31 for changing the angular position of each wind panel means 28 with respect to the selection guide means 30 by displacing the angle selection wheel 52 of a particular wind panel means 28 from a forward position (see dotted line position in FIG. 3.) with respect to the column support 26 of the particular wind panel means 28 to a following position with respect to the same as illustrated in the four solid line drawn positions of the four wind panel means 28 in FIG. 3. In a preferred embodiment of the invention, the attachment beams 24 have a slight dog-leg shape as shown in FIG. 3 to permit the wind panel means 28 to fold to a desired angle. The forward position is the dotted line representation in FIG. 3 and illustrates that in this position, a particular wind panel means 28 is essentially juxtaposed to and generally flushed against one of its dog-leg shaped attachment beams 24. In FIG. 3 the wind direction is from south to north or from the bottom of FIG. 3 to the top of FIG. 3.

Figure 10:
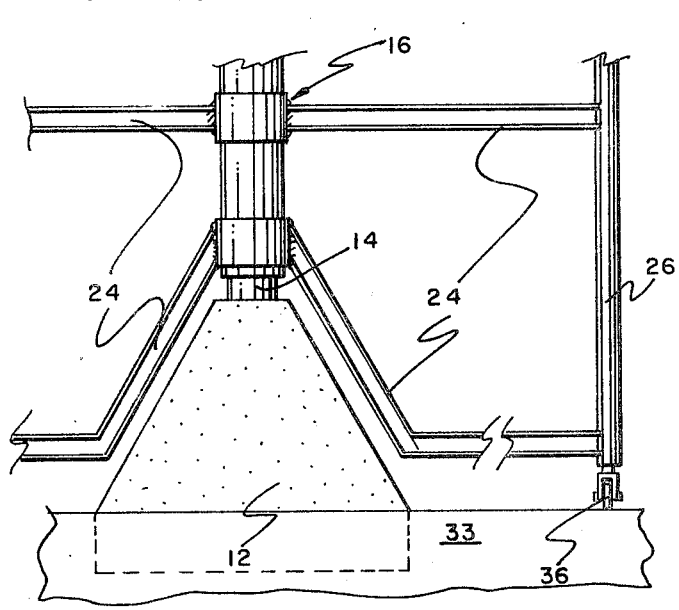
FIG. 10 is another embodiment of the invention having a frustoconical base.
Figure 11:
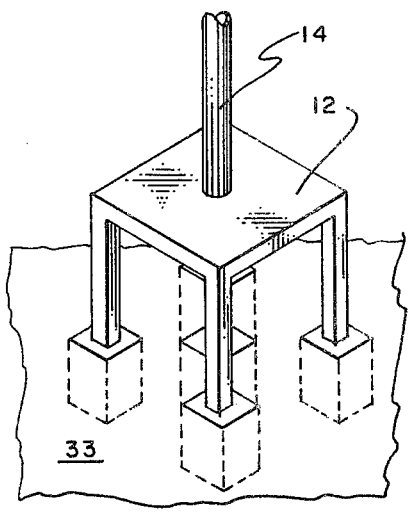
FIG. 11 is another embodiment of the base depicted as an elevated platform.

FIGS. 10-15 illustrate additional embodiments of the invention. FIG. 10 depicts a base 12 as being frusto-conical and upper and lower attachment beams 24 as being respectively straight or curved to form to the outside surface of the frusto-conical base 12. FIG. 11 depicts a base as an elevated platform to elevate the entire wind driven device 10 to any desired height to gain increased wind velocity. FIGS. 12-15 depicts a small low capacity wind driven device 10 that does not require transport wheels 36 and includes adjustable braces 54 interconnecting the base 12 with an anchor clamp 56 which is connected to the anchor pole 14. In the embodiment of the invention in FIGS. 12-15, the power drive means 18 (gears 29 and 32 and shaft 34) is positioned above the anchor clamp 56 and braces 54.

With continuing reference to the drawings for operation of the invention and the method of recovering wind energy to drive an electrical generator, or the like, to produce electricity, the mobile selection guide means 30 is positioned around the anchor pole 14 and drive assembly means 16 and its support pegs 33 may be implanted into the grid 38 to stationarily hold the same in place, depending on the weight of the selection guide means 30 and the velocity of the wind on any particular day. The position of the selection guide means 30 is adjusted such that, depending on the direction of the wind which in FIG. 3 is from south to north with south being the bottom of FIG. 3, the force of the wind against any particular wind panel means 28 is a maximum when the any particular wind panel means 28 is in a predetermined position with respect to the mobile wind panel angle selection guide means 30. The force of the wind against the guided wind panel means 28 causes the dog-leg shaped attachment beams 24 to rotate the drive assembly 16 which in turn causes the connected power drive means 18 to operate or drive the main shaft of the electrical generator. The angle selection wheel 52 of each of the wind panel means 28 traverses the exterior surface of the mobile wind panel angle selection guide means 30 as illustrated in FIG. 3. When any particular angle selection wheel 52 of any particular wind panel means 28 travels into the indentation 31 of the selection guide means 30, the angular position of the particular wind panel means 28 is changed with respect to the selection guide means 30, and the particular angle selection wheel 52 of the particular wind panel means 28 is displaced from a forward position (represented by dotted lines in FIG. 3) with respect to a particular column support 26 and while traversing the surface of the selection guide means 30 to a following position also with respect to the same particular column support 26 and while traversing the selection guide means 30, as illustrated in the solid line drawing of the four combined column support 26-wind panel means 28 in FIG. 3. If the direction of the wind changes, the selection guide means 28 may be rotated accordingly to compensate for the change in direction of the wind. For example in FIG. 3., if the direction of the wind changes from south-north to west-east, the selection grid means 30 would be rotated 90 degrees clockwise in order for the wind driven device 10 to effectively operate.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A wind driven device for driving an electrical generator to produce electricity comprising a base;

an anchor pole stationarily affixed to the base;

a drive assembly support rotatably mounted around the anchor pole;

power drive means secured to the lower portion of the drive assembly support, said power drive means comprises at least two intermeshing gear means, at least one gear means secured to the lower portion of the drive assembly and at least one another gear means meshing at right angles with the drive assembly gear means and having a generator shaft secured thereto;

an upper exterior wind column support means;

a lower exterior wind column support means;

a plurality of attachment beams connected to the drive assembly;

a plurality of wind panel support columns, each wind panel support column connecting to at least one of the attachment beams and to the upper exterior support means and to the lower exterior support means and including a transport wheel rotatably secured underneath thereto to support the support column against the grid as the wind driven device revolves about its anchor pole;

a plurality of wind panel means pivotally engage to the wind panel support columns and responsive to the wind such that the force of the wind against the wind panel means causes the drive assembly support and the attached power drive means to revolve to provide for a power takeoff from the revolving power drive means to drive the electrical generator;

and a mobile wind panel angle selection guide means positioned around the drive assembly support to permit operation of the wind driven device when the direction of the wind changes, said selection guide means has a generally circular structure defining an indentation for changing the angular traveling position of each wind panel means about and with respect to the selection guide means; and each of said wind panel means comprises an angle selection wheel for traversing the exterior circular surface of the selection guide means to angle each of the wind panel means to the appropriate angle of the wind and adapted in operation to temporarily lodge in the indentations for changing the angular position of each wind panel means with respect to the selection guide means by displacing the angle selection wheel of a particular wind panel means from a forward position with respect to the column support of the particular wind panel means to a following position with respect to the same, said particular wind panel means being essentially juxtaposed to and generally flushed against one of its attachment beams in the forward position.

2. The wind driven device of claim 1 additionally comprising a guy wire assembly means secured to the anchor pole for supporting the same.

3. A method of recovering wind energy to drive an electrical generator, or the like, to produce electricity comprising the steps of:

(a) positioning a mobile wind panel angle selection guide means around a drive assembly means which is rotatably mounted to an anchor pole of a wind driven device engaged to the electrical generator through a power drive means connected to the drive assembly means;

(b) mounting a plurality of wind panel means to the drive assembly to be guided by the mobile wind panel angle selection guide means such that the force of the wind against the guided wind panel means rotates the drive assembly which in turn causes the connected power drive means to operate the electrical generator; and (c) adjusting the position of the mobile wind panel angle selection guide means such that the force of the wind against any particular wind panel means is a maximum when the any particular wind panel means is in a predetermined position with respect to the mobile wind panel angle selection guide means;

(d) connecting an angle selection wheel to each of the wind panel means to traverse the surface of the mobile wind panel angle selection guide means; and indenting the surface structure of the mobile wind panel angle selection guide means; and (e) lodging temporarily a particular angle selection wheel of a particular wind panel means in the indentation of the mobile wind panel angle selection guide means for changing the angular position of the particular wind panel means with respect to the mobile wind panel selection guide means by displacing the particular angle selection wheel of the particular wind panel means from a forward position while traversing the surface of the mobile wind panel selection guide means to a following position while traversing the same.

4. The method of claim 3 additionally comprising interconnecting the wind panel means to the drive assembly means by a plurality of attachment beams.

5. The method of claim 4 additionally comprising dog-legging the shape of each attachment beam to permit each of the wind panel means to fold to a desired angle with respect to the mobile wind panel angle selection guide means.

* * * * *